Sept. 17, 1935.    L. A. GEBHARD ET AL    2,014,930
ELECTRICAL CONDENSER
Filed March 19, 1931    3 Sheets-Sheet 1
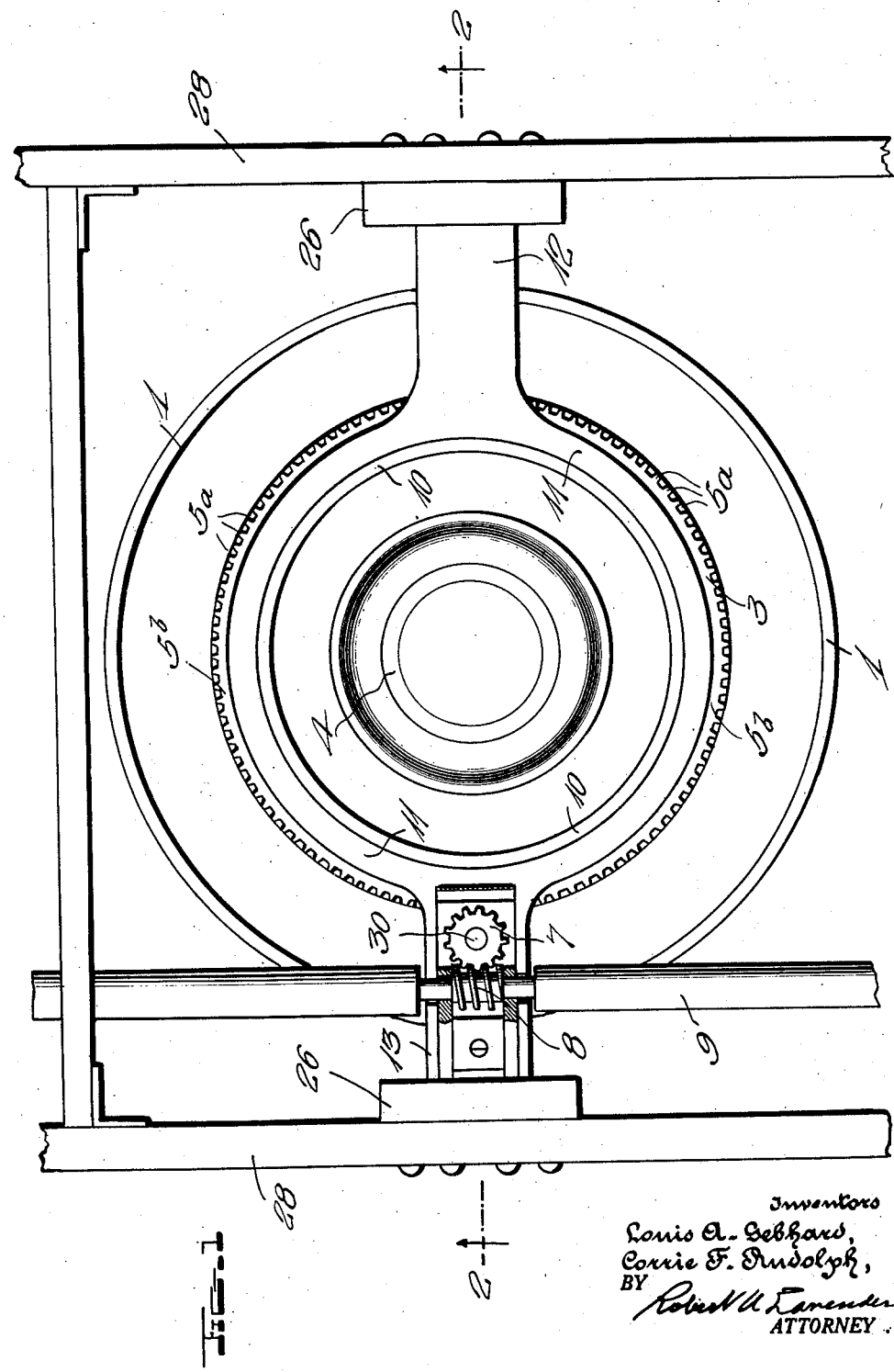
Inventors
Louis A. Gebhard,
Corrie F. Rudolph,
BY
ATTORNEY Sept. 17, 1935. L. A. GEBHARD ET AL 2,014,930
ELECTRICAL CONDENSER
Filed March 19, 1931 3 Sheets-Sheet 2
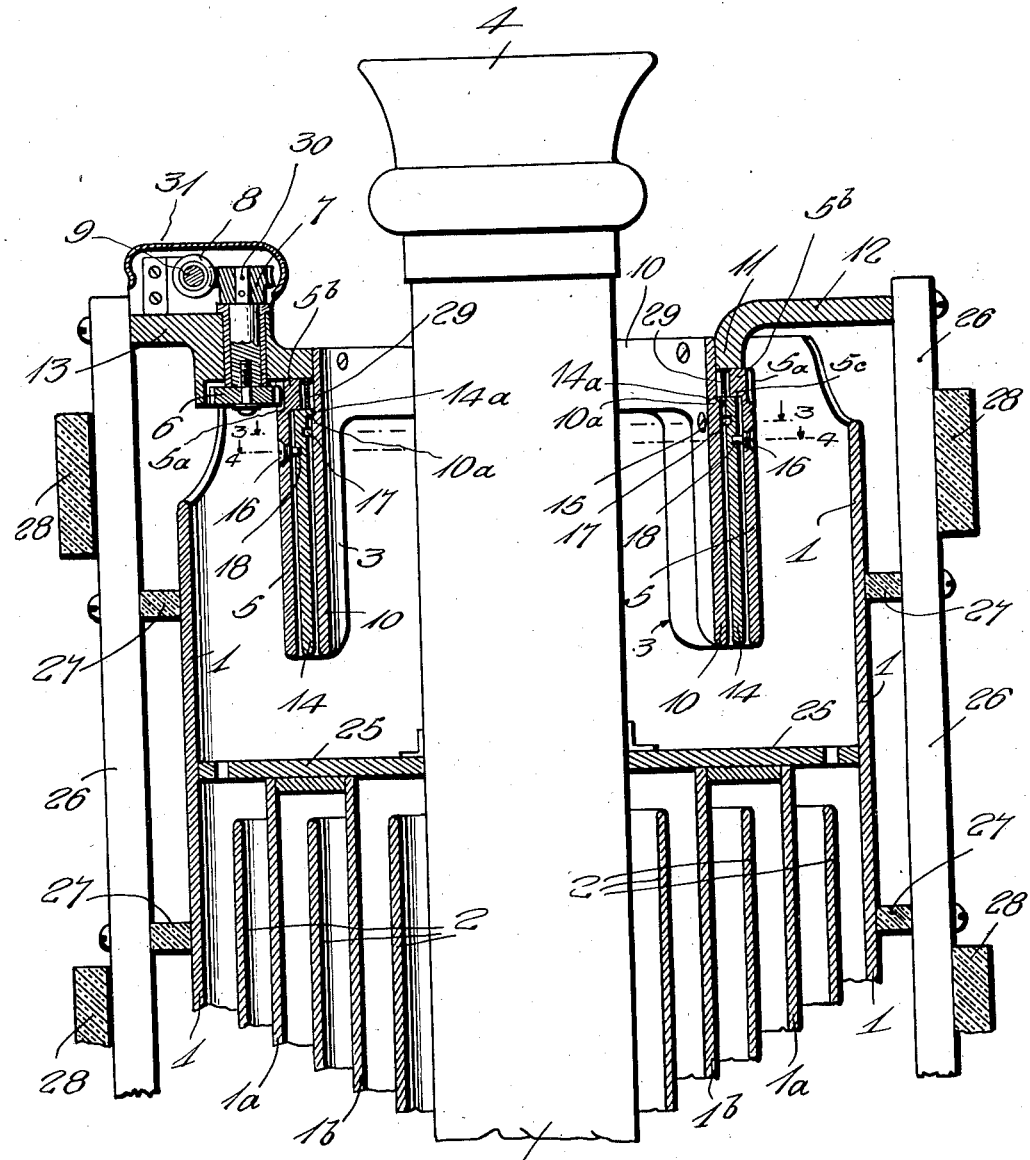
Inventors
Louis A. Gebhard,
Corrie F. Rudolph,
BY Robert A. Lavender
ATTORNEY.

Sept. 17, 1935.  L. A. GEBHARD ET AL  2,014,930
ELECTRICAL CONDENSER
Filed March 19, 1931  3 Sheets-Sheet 3
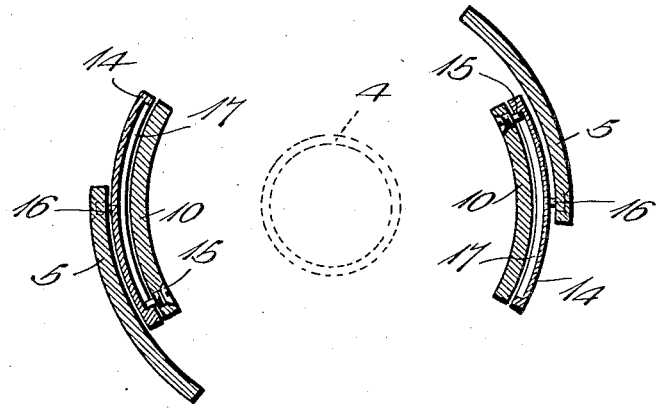
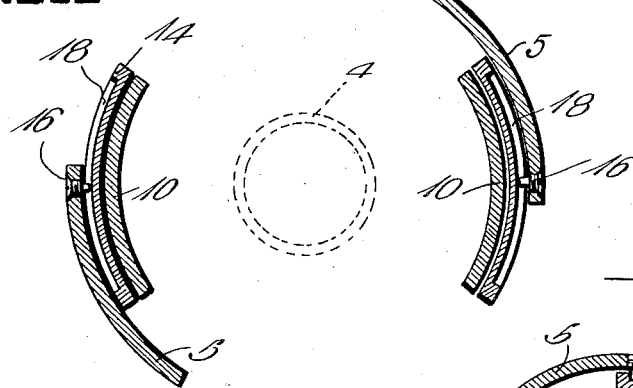
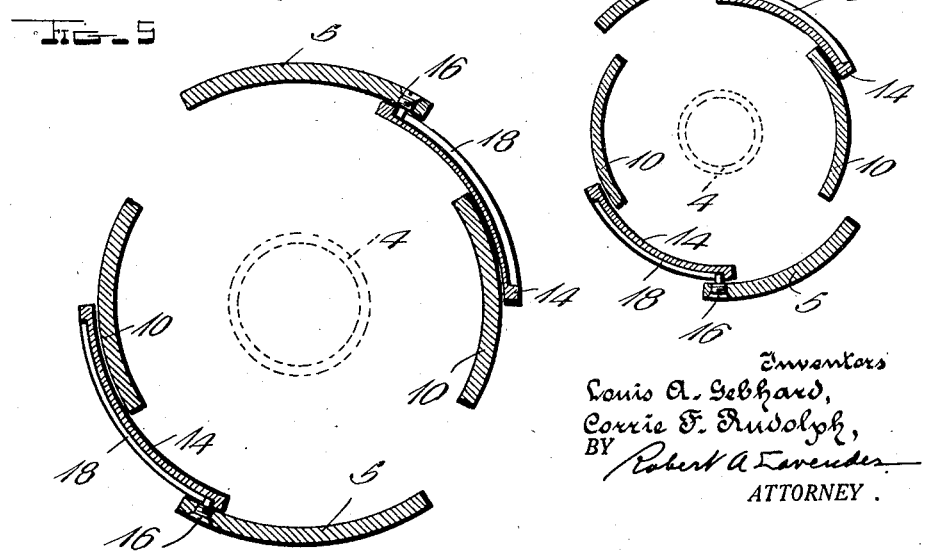
Inventors
Louis A. Gebhard,
Corrie F. Rudolph,
BY
ATTORNEY.

Patented Sept. 17, 1935

2,014,930

UNITED STATES PATENT OFFICE 2,014,930

ELECTRICAL CONDENSER

Louis A. Gebhard and Corrie F. Rudolph, Washington, D. C., assignors to Wired Radio, Inc., New York, N. Y., a corporation of Delaware Application March 19, 1931, Serial No. 523,849

11 Claims. (Cl. 175—41.5)

Our invention relates broadly to electrical condensers and more particularly to a construction of balance condenser for high frequency circuits.

One of the objects of our invention is to provide an improved construction of balancing condenser for high frequency circuits having means for accurately adjusting the effective capacity thereof to meet required conditions in the tuning circuits of an amplifier system.

Another object of our invention is to provide a construction of balance condenser in which a multiplicity of circular plate members may be rotatably adjusted to provide a desired effective capacity area for a balance condenser system.

Still another object of our invention is to provide a compact construction of balance condenser in which one plate of the condenser is formed by a multiplicity of telescopically arranged segmental plate members which are adapted to be angularly shifted for establishing a capacity area of predetermined value.

A further object of our invention is to provide a construction of balance condenser particularly adapted for a push pull amplification system wherein a multiplicity of angularly shiftable plate members is mounted in a position depending one upon another, certain of the plate members being angularly shiftable in overlapping relationship for increasing or reducing the capacity area of the plate for changing the effective capacity of the balance condenser system.

Other and further objects of our invention reside in the construction of a balance condenser system for high frequency signaling circuits as set forth more fully in the specification hereinafter following by reference to the accompanying drawings, in which:

Figure 1 is a plan view of the balance condenser arrangement and actuator therefor; Fig. 2 is a central vertical longitudinal section through the condenser on line 2—2 of Fig. 1; Fig. 3 is a horizontal sectional view through the adjustable balance condenser plate taken on line 3—3 of Fig. 2; Fig. 4 is a horizontal sectional view through the balance condenser plate on line 4—4 of Fig. 2; Fig. 5 is a view similar to Fig. 4 with the effective capacity area of the balance plate enlarged by the angular movement of the sector members forming the balance condenser plate; and Fig. 6 is a view illustrating the sectors of the balance condenser plate further shifted in angular position to form the further enlargement of the effective area of the balance condenser plate.

Referring to the drawings in detail the stationary plate 1 of the balance condenser is formed by an extension of the outer plate of the main tuning condenser which includes sets of movable plates 2 adapted to be interleaved with respect to the outer stationary plate 1 and the intermediate stationary plates 1a and 1b. The stationary plates 1a and 1b are concentrically disposed around the jacket 4 of the high power tube and suspended from a plate 25 which extends between the jacket 4 and the outer plate 1. The set of stationary plates is supported from frame 26 by insulated spacer members 27 which frame is in turn supported from the transmitter frame by insulation members 28 as shown. The upper portion of plate 1 of the main tuning condenser serves as one capacity area for the balance condenser. The other capacity area for the balance condenser is represented by the nested assembly of plates indicated generally at 3. The nested assembly of plates is suspended by means of a spider having a depending central ring portion 11 concentrically within which there is mounted the segmental stationary plate member 10 having a pair of downwardly projecting segmental portions as shown. The depending stationary plate member 10 has an angular shoulder 10a formed on the exterior thereof which serves as a support for a pair of segmental plate members 14 each having inwardly extending flanges 14a which engage the shoulders 10a on the plate 10. An annular spacing member 29 in the form of a corrugated friction or spacing band is disposed beneath the edge of ring member 11 and the top edge of segmental plate members 14. The band 29 prevents undesired movement or rattling of the plate members. The segmental plate members 14 are provided with arcuate channelways 17 cut in the interior surface thereof. Arcuate shaped channelways or grooves 18 are cut into the exterior surface of segmental plate members 14. Screw members 15 extend through segmental plate members 10 and project into the grooves 17 of segmental plates 14. A set of external segmental plates 5 is arranged with each plate connected at its upper extremity by an annular ring 5b terminating in a shoulder 5c which slides upon the upper extremity of one of the segmental plate members 14. The outer periphery of the ring member 5b is provided with gear teeth 5a with which the pinion 6 is adapted to mesh. Pinion 6 is driven by a shaft member 30 which extends downwardly through one of the spider arms 13 which projects from the ring 11. The shaft 30 has a helical gear 7 secured thereto which is driven by the worm gear 8 positioned on adjustable shaft 9. By this structure a reduction gearing is provided which constitutes means for obtaining micrometric adjustments of the movable condenser plates with respect to the stationary condenser plates. The moving parts are housed as represented at 31, the housing being broken away in Fig. 1. The gear teeth 5a on the cylindrical member 5 extend entirely around the periphery of the plate 5. Similarly the shoulder 5c extends wholly around plate 5 and is slidably supported on the upper end of the unit which carries the depending segmental plates 14.

The annular flange 14a of the segmental plates 14 extends wholly around the cylindrical member 10 and is supported throughout its circumference by the shoulder 10a on plate 10. The segmental plates 5 are each provided with inwardly projecting screw members 16 which extend into coacting slots 18 in the outer surfaces of the segmental plates 14. The plates 5, 14 and 10 constitute three concentric cylinders nested one with respect to another. Cylinder 10 is stationary while cylinders 14 and 5 may be shifted in an angular direction to allow the extension of the effective capacity area of the plate member 3. It will be understood that the cylindrical portions of the nested plates only extend a short distance at the top of the plates as the depending portions of the plates are in the form of segments which may be overlapped in differing amounts for varying the effective capacity area of the plate system 3.

It will be understood from a study of Figs. 3-6 that the degree of overlapping of the several plates constituting plate system 3 is governed by step-like movements, that is to say, after the depending segments of the cylinder 5 have been revolved to a position adjacent the overlapping edges of the segments 14, the pins 16 projecting into the co-acting grooves 18 serve to further revolve the segments 14 which are angularly shifted with respect to segments 10 for a distance limited by the abutment of screws 15 with the ends of the slots formed in plates 14.

We have found the balance condenser of our invention extremely compact and practical in its construction. The effective area of the plate system is accurately controlled for the purpose of bringing about an accurate balancing of the circuits of the associated amplifier system. The adjusting shaft 9 extends to a position exterior to the transmitter panel from which point the shaft may be operated for adjusting each of the balance condensers. In push pull amplification systems two adjustable units may be provided, and shaft 9 controls both of these units from the exterior of the transmitter frame.

While we have described our invention in one of its preferred embodiments, we desire that it be understood that modifications may be made and that no limitations upon our invention are intended other than are imposed by the scope of the appended claims.

What we claim as new and desire to secure by Letters Patent of the United States is as follows:

1. A variable condenser comprising a cylindrical plate member and a set of plate members disposed concentrically with said cylindrical plate member, said set of plate members including a member, a multiplicity of independent units each having depending segments, and means for varying the overlapping relationship of the segments of said set of plate members with respect to each other for changing the effective capacity between said set of plate members and said first mentioned cylindrical plate member.

2. A variable condenser comprising a cylindrical plate constituting one side of a condenser system, a set of plate members constituting the other side of the condenser system, said plate members each including depending segment portions, and means for varying the overlapping relationship of said segment portions with respect to each other for changing the effective capacity between said set of plate members and said cylindrical plate.

3. A variable condenser comprising a cylindrical condenser plate constituting one capacity area of the condenser, a set of plate members constituting the other capacity area of the condenser system, said set of plate members each having cylindrical portions concentrically disposed about each other with depending segment portions, and means for variably overlapping said segment portions for changing the effective capacity between said set of plate members and said cylindrical plate.

4. A variable condenser comprising a cylindrical condenser plate forming one capacity area of the condenser, a set of plate members concentrically disposed with respect to said cylindrical plate and constituting the opposite capacity area of the condenser, said plate members each including depending segment portions, and a gearing mechanism for shifting said plate members circumferentially for varying the overlapping relationship between said plate members for changing the effective capacity between said set of plate members and said cylindrical plate.

5. A variable condenser comprising a hollow cylinder constituting one capacity area, a plurality of concentrically disposed cylindrically segmental plate members constituting an opposite capacity area, and means for circumferentially varying the overlapping relationship of said plate members for changing the effective capacity between said set of plate members and said hollow cylinder.

6. A variable condenser comprising a support, a cylindrical plate member mounted upon said support, a frame extending from said support, a tubular plate member carried by said frame in a position concentrically within said cylindrical plate member and spaced therefrom, said tubular member having a pair of segment portions thereon normally exposed in predetermined capacity relation with respect to said cylindrical plate member, and an auxiliary plate member extending circumferentially around said tubular plate member and electrically connected thereto and having segment portions thereon adapted to be variably overlapped with respect to the segment portions on said tubular plate member for changing the effective capacity of the assembly of said auxiliary plate member and said tubular plate member with respect to said cylindrical plate member.

7. A variable condenser comprising a support, a cylindrical plate member mounted upon said support, a frame extending from said support, a tubular plate member carried by said frame in a position concentrically within said cylindrical plate member and spaced therefrom, said tubular member having a pair of segment portions thereon normally exposed in predetermined capacity relation with respect to said cylindrical plate member, a plurality of auxiliary plate members concentrically disposed with respect to said tubular plate member and electrically connected therewith, segment portions on said auxiliary plate members, and means for variably overlapping the segment portions on said auxiliary plate members with the segment portions on said tubular plate member for varying the effective capacity between the assembly of said auxiliary plate members and said tubular plate member with respect to said cylindrical plate member.

8. A variable condenser comprising a support, a cylindrical plate member mounted thereon, a frame carried by said support adjacent one end of said cylindrical plate member, a tubular plate member mounted on said frame concentrically within said cylindrical plate member, segment portions on said tubular plate member, an annular shoulder on said tubular plate member, an auxiliary plate member concentrically mounted with respect to said tubular plate member and supported with respect thereto upon said annular shoulder, segment portions on said auxiliary plate member, and means for variably overlapping the segment portions on said auxiliary plate member with respect to the segment portions on said tubular plate member.

9. A variable condenser comprising a support, a cylindrical plate member mounted thereon, a frame carried by said support adjacent one end of said cylindrical plate member, a tubular plate member mounted on said frame concentrically within said cylindrical plate member, segment portions on said tubular plate member, an annular shoulder on said tubular plate member, an auxiliary plate member concentrically mounted with respect to said tubular plate member and supported with respect thereto upon said annular shoulder, an independent cylindrical plate member concentrically disposed and supported upon said auxiliary plate member, segments on said independent plate member, and connections between said independent plate member and said auxiliary plate member, whereby circumferential motion imparted to said independent plate member is transmitted to said auxiliary plate member for variably overlapping the segment portions on said plate members and changing the effective capacity relationship with respect to said cylindrical plate member.

10. In a variable condenser, a support, a cylindrical plate member mounted on said support, a frame at one end of said support, a tubular plate member mounted on said frame and extending concentrically with respect to said cylindrical plate member, said tubular member having a pair of oppositely positioned segment portions, a plurality of tubular members concentrically disposed about said aforementioned tubular member each having segment portions adapted to overlap the segment portions of said tubular plate member, means for maintaining said plurality of plate members in electrical and mechanical connection with said first mentioned tubular plate member, and means for imparting angular movement to said plurality of tubular plate members successively for varying the overlapping relation of the segment portions and changing the effective capacity with respect to said cylindrical condenser plate.

11. In a variable condenser, a support, a cylindrical plate member mounted on said support, a frame at one end of said support, a tubular plate member mounted on said frame and extending concentrically with respect to said cylindrical plate member, said tubular member having a pair of oppositely positioned segment portions, a plurality of tubular members concentrically disposed about said aforementioned tubular member each having segment portions adapted to overlap the segment portions of said tubular plate member, means for maintaining said plurality of plate members in electrical and mechanical connection with said first mentioned tubular plate member, teeth formed around the periphery of one of said tubular members, and a rotatable gear device meshing with said teeth and adapted to impart angular movement to said plate members for variably overlapping said segment portions and changing the effective capacity relation with respect to said cylindrical plate member.

LOUIS A. GEBHARD.
CORRIE F. RUDOLPH.